United States Patent [19]
Krygowski et al.

[11] Patent Number: 5,632,013
[45] Date of Patent: May 20, 1997

[54] MEMORY AND SYSTEM FOR RECOVERY/RESTORATION OF DATA USING A MEMORY CONTROLLER

[75] Inventors: Matthew A. Krygowski, Hopewell Junction; Arthur J. Sutton, Cold Spring, both of N.Y.

[73] Assignee: International Business Machines Corporation, Armonk, N.Y.

[21] Appl. No.: 677,161

[22] Filed: Jul. 11, 1996

Related U.S. Application Data

[63] Continuation of Ser. No. 484,440, Jun. 7, 1995, abandoned.

[51] Int. Cl.$^6$ ................................................. G06F 11/00
[52] U.S. Cl. ................................................. 395/182.05
[58] Field of Search .................. 395/182.03, 182.04, 395/182.05, 182.19, 182.07

[56] References Cited

U.S. PATENT DOCUMENTS

| | | | |
|---|---|---|---|
| 4,099,234 | 7/1978 | Woods et al. | 364/200 |
| 4,862,350 | 8/1989 | Orr et al. | 364/134 |
| 4,881,164 | 11/1989 | Hailpern et al. | 364/200 |
| 5,023,779 | 6/1991 | Federico et al. | 364/200 |
| 5,051,887 | 9/1991 | Berger et al. | 364/200 |
| 5,144,692 | 9/1992 | Baker et al. | 395/425 |
| 5,161,156 | 11/1992 | Baum et al. | 371/7 |
| 5,212,784 | 5/1993 | Sparks | 395/575 |
| 5,239,629 | 8/1993 | Miller et al. | 395/325 |
| 5,271,023 | 12/1993 | Norman | 371/68.3 |
| 5,313,628 | 5/1994 | Mendelsohn et al. | 395/575 |
| 5,388,242 | 2/1995 | Jewett | 395/425 |
| 5,398,331 | 3/1995 | Huang et al. | 395/575 |
| 5,455,940 | 10/1995 | Daniel et al. | 395/182.02 |
| 5,491,787 | 2/1996 | Hashemi | 395/182.09 |

*Primary Examiner*—Robert W. Beausoliel, Jr.
*Assistant Examiner*—Norman M. Wright
*Attorney, Agent, or Firm*—Bernard M. Goldman; Lily Neff

[57] ABSTRACT

A method and device for correcting hardware errors without loss of resources while maintaining continuous operation of the computer system. Same method and device can be used for repair or addition of hardware parts to this system. The method and device can operate in a fault tolerant system which allows continuous service during the occurrence of a hardware failure or while parts are being repaired or added to the system. The method and device also use Hamming code to detect and correct all hardware failures, particularly a soft-soft uncorrectable error and a special uncorrectable error or a SUE.

19 Claims, 4 Drawing Sheets

MEMORY AND SYSTEM FOR RECOVERY/ RESTORATION OF DATA USING A MEMORY CONTROLLER

This application is a continuation of application Ser. No. 08/484,440, filed Jun. 7, 1995, now abandoned.

FIELD OF THE INVENTION

A system and method for adding storage and memory controller arrays and for replacing and repairing such arrays after detection of hardware failures in a fault tolerant computer system with dual fetch and store capability.

BACKGROUND

Error correction codes were invented to ensure data integrity in a computer system. Error correction, in general, is performed by providing at least an extra verification bit, known as a parity bit, at the end of n block of binary digits or bits, so that the data bits will contain an even (even parity) or an odd (odd parity) number of 1 bits. At the receiving end, the complete block is checked and if the proper number of 1's (even or odd) is not provided, an error is detected.

There are various ways of performing error detection and correction by utilizing Error Correction Code (hereinafter EC code.) In more sophisticated computer systems, several parity checker bits are dedicated to error detection and correction, with each parity bit being assigned to a certain block of data in order to pinpoint the exact location of potential problems areas with more accuracy.

A more popular EC code used is the Hamming Code. Hamming Code adds several check or verification bits to the end of each n (four to eight) block of data bits. In this way a parity byte can include, for example, 8 bits of Hamming code. When recalculated by the receiving device, these check bits can be used to determine whether each of the n block of data bits was received correctly, and they can, in some circumstances, be used to correct erroneous bits. Hamming code allows for single bit failure error detection and correction as well as two bit failure error detection and correction. Even some three bit failures will also be detected.

For example, in a word of thirty-two bits, composed of four eight bit bytes having a parity checker bit for each byte, single and double bit failures in the data bits as well as the parity bit will be detected, with correction for single bit failures.

Most system designs today have implemented a form of the Hamming code for the hardware (storage and/or memory controller) to detect and correct single bit failure and to detect two bit failures.

Error types can be classified into hard or soft categories. A hard array error is a broken component that if retried retains its broken state. A soft array error occurs when the broken state can be changed by rewriting the data to the array.

Another type of error occurs during a cache castout to store. This error is caused when an error is experienced during the store so that at the end of the store it is uncertain as to whether the data contained in the cache is viable data. To detect this condition Hamming Code utilizes a special error correction byte known as a Special Uncorrectable Error (SUE) byte. A SUE stores a special encoded syndrome that is recognized by the Hamming Code as an uncorrectable error. When an error has been detected in storing a block of master data, under this method, integrity of data is protected by storing the special error syndrome noting an uncorrectable error in the address of the store. In this manner, any further access or fetching of the address containing the defective data is prevented by storing a special syndrome noting uncorrectable error in that location.

A SUE may also be used when a memory controller fails to store data after notifying the requestor the data is good. One example being loss of data in the logic path of the memory controller. The memory controller will force the SUE syndrome in those examples.

When dealing with a two bit failure, the failure may contain either a two bit hard or two bit soft failures or a combination of a hard and soft bit failures. Once an error is detected, through the use of the Hamming Code it is determined whether the error is a H-H, H-S/S-H, S-S or an SUE, each error condition having a special binary combination.

Once the error is detected, there are methods available for correcting particular types of errors. For example a hard-hard error can be corrected using a complement/recomplement algorithm known in the art. This particular algorithm rewrites the binary complement of data to the array while retaining the original failing data state. Thus when data is written back to the original data; in the two bit hard case the bits retain their solid error state.

When there is a combination of hard-soft error, a single error correcting code algorithm is utilized. Under this algorithm, a solid error state is preserved due to the existence of the hard error.

However, under both algorithms no solid error state will be established when there is a soft-soft (S-S) error since both bits take on a new state and can not be corrected. Similarly, a SUE cannot be corrected either due to the nature of its uncorrectable state.

Therefore when the error detected contains a hard error in either or one of the bits, correction can be performed easily. There are algorithms that can correct two failing hard bits (H-H), or two failing hard or soft bits (H/S, or S/H). Nevertheless, the problem occurs when two soft state (S-S) bit failures are detected. Although detection of two bit soft state failures are possible, there are no known algorithm or code today for correcting a two bit soft error. It has been an ongoing challenge to provide an algorithm to ensure this type of error correction.

Hence those concerned with the development of error correction algorithms have recognized the need for a soft-soft or SUE correction code. The present invention fulfil this need and others.

SUMMARY OF THE INVENTION

Briefly and in general terms, a device and method for the same are provided having a multiprocessor system with at least one memory unit, and having at least two memory controller's, and two or more input-output (I/O) processors. Each of these I/O processors being defined as a requestor. The method involves the assigning each memory controller to different storage areas in the main storage unit so that the memory portions assigned to the controllers can be accessed an any time and used as a main or backup storage unit.

When a hardware error is detected or when parts are to be added or repaired, the memory controller which has the desired memory portion (one with no error or additional data) will write over the other memory portion associated with the other memory controller. One memory controller is assigned as the primary memory controller and the other memory controller is the secondary memory controller. The primary memory controller maintains the handling of cross interrogations and the synchronization of data for both memory controllers to ensure identity is preserved between multiple copies of data. In this manner, data is always restored during a hardware failure and continuous operation of the system is ensured when part of the multiprocessor system has to be configured off for repairs and/or part additions.

The system may also have redundant extended storage arrays which are larger than the main or control storage. Generally data is fetched in blocks, however an error correcting code is applied on a word basis, utilizing a Hamming code.

Other features and advantages of the invention will become apparent from the following detailed description and accompanying drawings, illustrating by way of example the features of the invention.

BRIEF DESCRIPTION OF THE DRAWINGS

The subject matter which is regarded as the invention is particularly pointed out and distinctly claimed in the concluding portion of the specification. The invention however, both as to organization and method of practice, together with the further objects and advantages thereof, may best be understood by reference to the accompanying drawings in which:

DETAILED DESCRIPTION OF THE PREFERRED EMBODIMENT

A fault tolerant system is designed to allow continuous operation of the computer system during the occurrence of hardware failures. In general, many fault tolerant systems such as the multiprocessor 10 shown in FIG. 1, consist of at least one or more Central Processors (CP), all indicated for clarity by numeral 11, multiple input/Output Processors (IOP) 12 and two or more memory controllers (MC) 13 with or without extended storage controllers 14 provided.

When a hardware failure occurs, the validity of storage data has to be maintained, in order to ensure data integrity. Furthermore, when a storage element, controller or array reaches a maintenance threshold, the element has to be repaired by being taken out of the configuration. In other instances the system has to be powered down for a part replacement of the controller or the array. In a fault tolerant system all these tasks must be accomplished as the rest of the system continues to function. Therefore, to ensure data integrity, all copies of the original data must reside in the remaining portion of the running system. Although not all of the storage data has to be copied multiple times, nevertheless, restoring a redundant storage array while keeping the rest of the system (ongoing system) running has been a challenge. The main objective is to have all master data in the primary or running system's arrays and later copy them to the secondary or on-coming system's arrays after the repair or replacement is completed.

Figure 1:
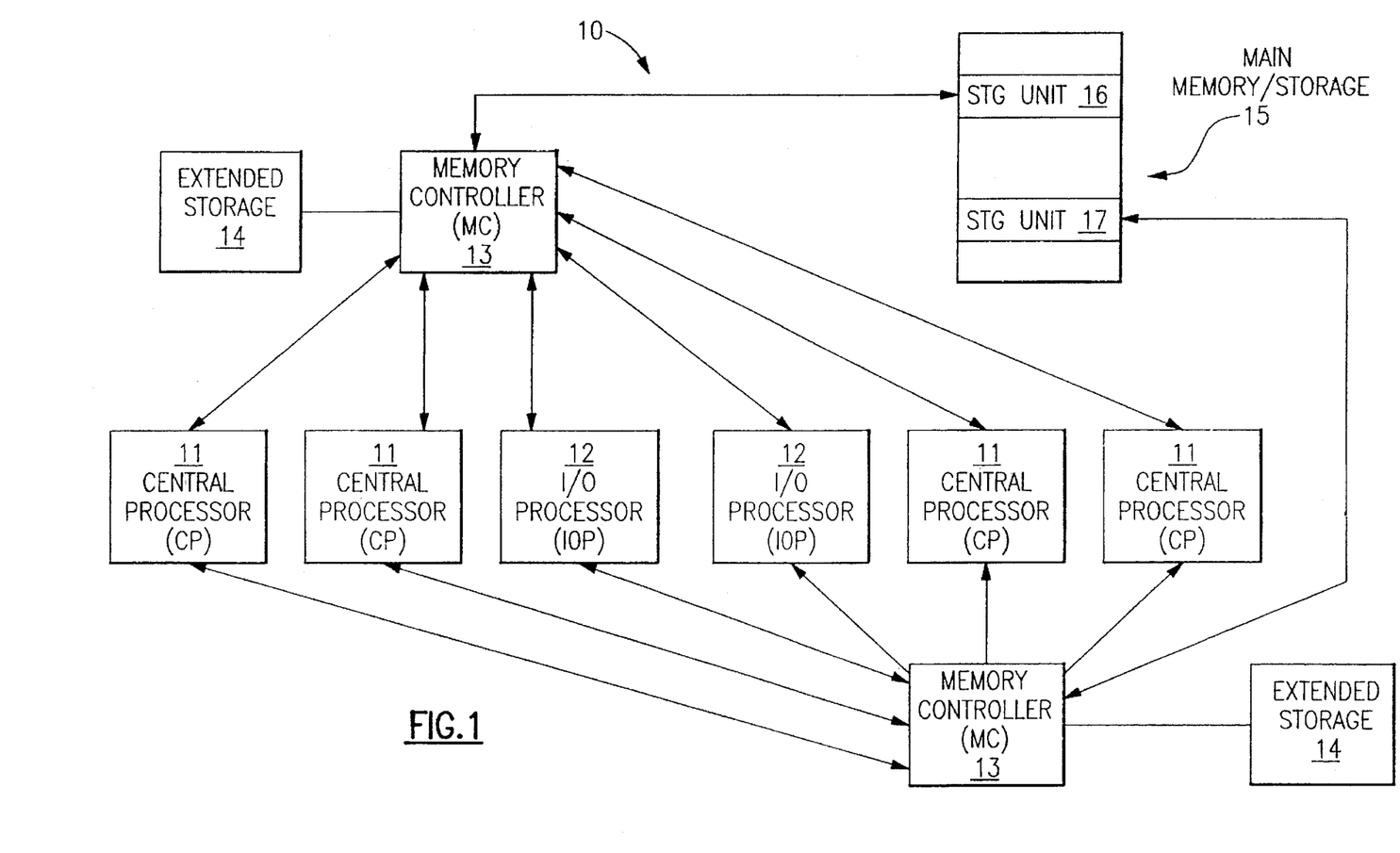
FIG. 1 is an illustration of a multiprocessor system such as used in one embodiment of the present invention.

As explained in U.S. Ser. No. 08/349,768 incorporated here by reference, the multiprocessor system 10 of FIG. 1 is arranged so that information is simultaneously stored in multiple storage areas 16 and 17 of the main memory 15 by either memory controller. The multiprocessor itself is divided into dual sides, each side having access to at least one memory controller 14 and Central Processor 11. Each side also being defined as a primary or a secondary side depending on the control that each memory controller 14 has over a certain task to be performed.

Either memory controller 14 can access and store data from the areas 16 and/or 17 dedicated to each controller 13 during initialization. Data integrity is provided and latest changes in data are protected by means of an interlocking data protection mechanism. However, should a failure occur, there is always a second backup copy of data available to the system from the other memory controller 13. This dual system of storage and memory controllers 13 also allows moving storage from one physical array to another prior to performing maintenance or removing and adding arrays to or from the system.

For each rquestor (CP/IOP) stores are made to all memory controllers 13 where redundant copies are directed by the operator. Each requestor (11 or 12) selects one of the memory controllers as a primary system controller 13 and the remaining system controller as a secondary system controller 13. The selection of these system controllers as primary or secondary being stored by a unit of data associated with each of these requestors.

In one embodiment of the present invention, a form of the Hamming code is implemented in each Memory controller 13. The Memory Controllers 13 are designed to detect single or two bit failures when there is any data integrity problems during a hardware failure or when arrays and other controller elements are being worked on.

After the error has been detected, in one embodiment of the present invention, the requestor (11 or 12) signals one of the Memory Controllers 13 with a new command, and provides the address and identifier of the side of the system where error occurred. The System maintains exclusive lock control of line to be copied in the primary memory Controller. The System then copies the data word from the good side to the side associated with detected error and acknowledges the result to the requestor to continue from that point by refetching the data. The System also keeps a lock mechanism in place as to keep exclusive line control while copying the data.

Data in storage may be stored as a modification of a byte(s) of data or as a whole word of data. Byte or bit changes within a byte must be fetched before a store is done. Full store is done by an IOP or an extended store. An IOP also does byte or bit changes when altering control blocks, the process being similar to CP fetches.

Figure 2:
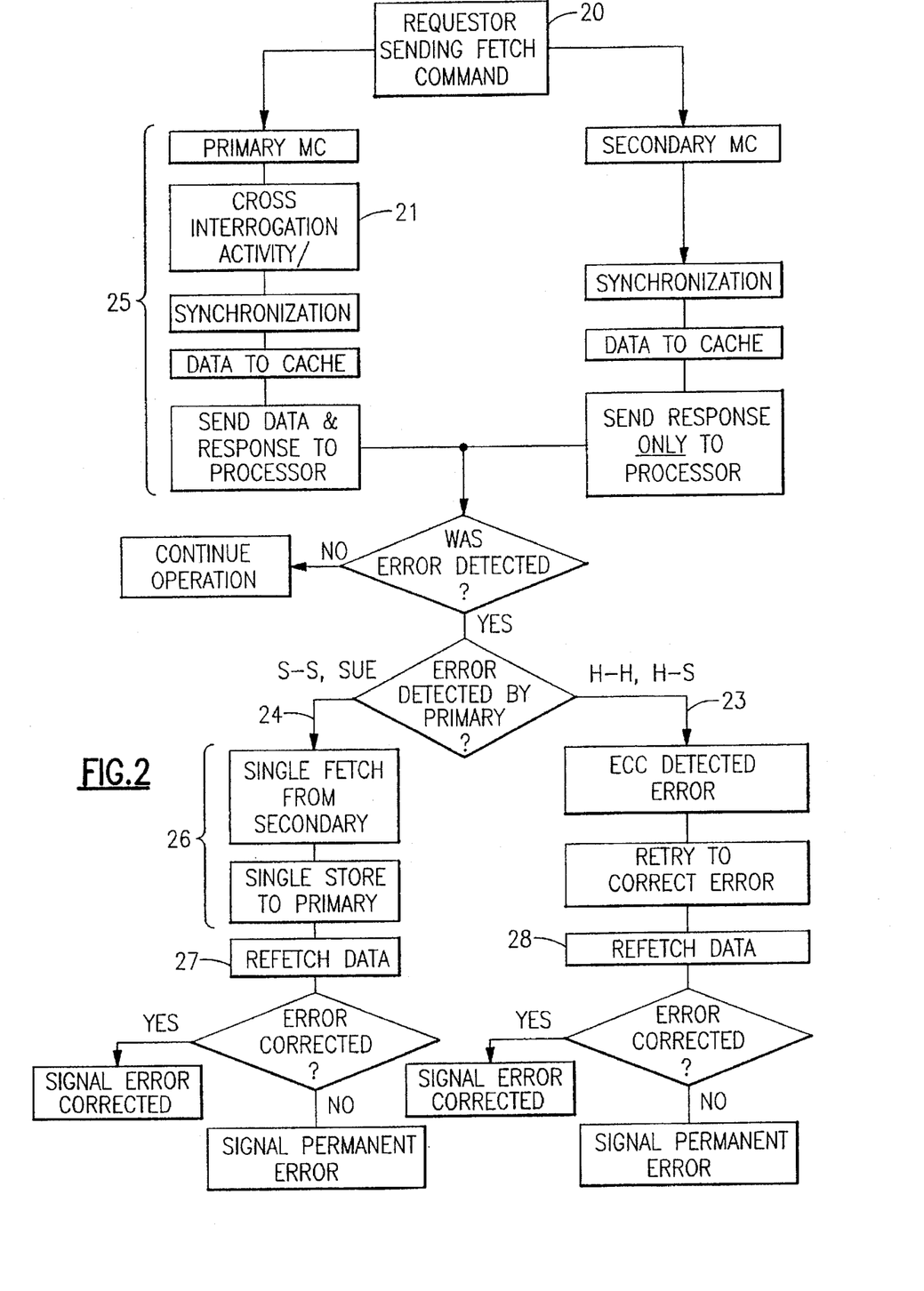
FIG. 2 is a flow chart showing the process explained in one embodiment of the present invention for detecting and correcting hardware failures.

FIG. 2 shows an example of this operation, when the requestor has sent an exclusive fetch command. The requestor sends the fetch command 20 to the memory controller. The memory controllers process this request 25, with the primary providing the cross interrogation activity 21 to make data is the same in both sides. When an error is detected, if the failure occurs in the secondary side 23, the primary side continues as primary and no switch has to be made to the secondary side. If the failure is in the primary side 24, a switchover 26 has to be made so that the secondary side becomes the primary side in effect. (Note an error can occur during a fetch or store cycle as well as in the simultaneous fetch of the secondary side.) The data when completed is refetched 27 and 28 to ensure the data is stored without error.

If the failure is related to the requestor, the process is the same. The failing address and side ID of the failing part is given to the System so that the copy of good data is made from the primary to the secondary, or vice-versa. In both cases, the data is refetched to ensure validity and correctness of the new data in this new location.

With the copy of the good data available when a soft-soft error occurs, the SC writes over any soft errors, also correcting data in storage of the side associated with the failure, and the address containing the SUE as may be the case. In this manner, no repair or degradation (running the system without the redundant backup of memory) need be done to the system.

In the case of a hard/hard error or a memory controller failure that prevents access to the primary/secondary arrays a repair must be scheduled to correct the failing condition (this can be immediate or delayed.) In the interim, since some or all of the addresses are not accessible the fault tolerance of the system is degraded.

In one embodiment of the present invention the system design allows separate power boundaries to the memory controller and to the storage arrays, so the system will allow concurrent repair to a part of the system, the on-coming side, while the remaining system, the on-going side, is powered and running.

The prior art would have the system continue to a point where either it was completely restarted (IPL) or stopped at a logical point, system quiesce, at which time the complete storage of one side had to be copied to the other side.

Figure 3:
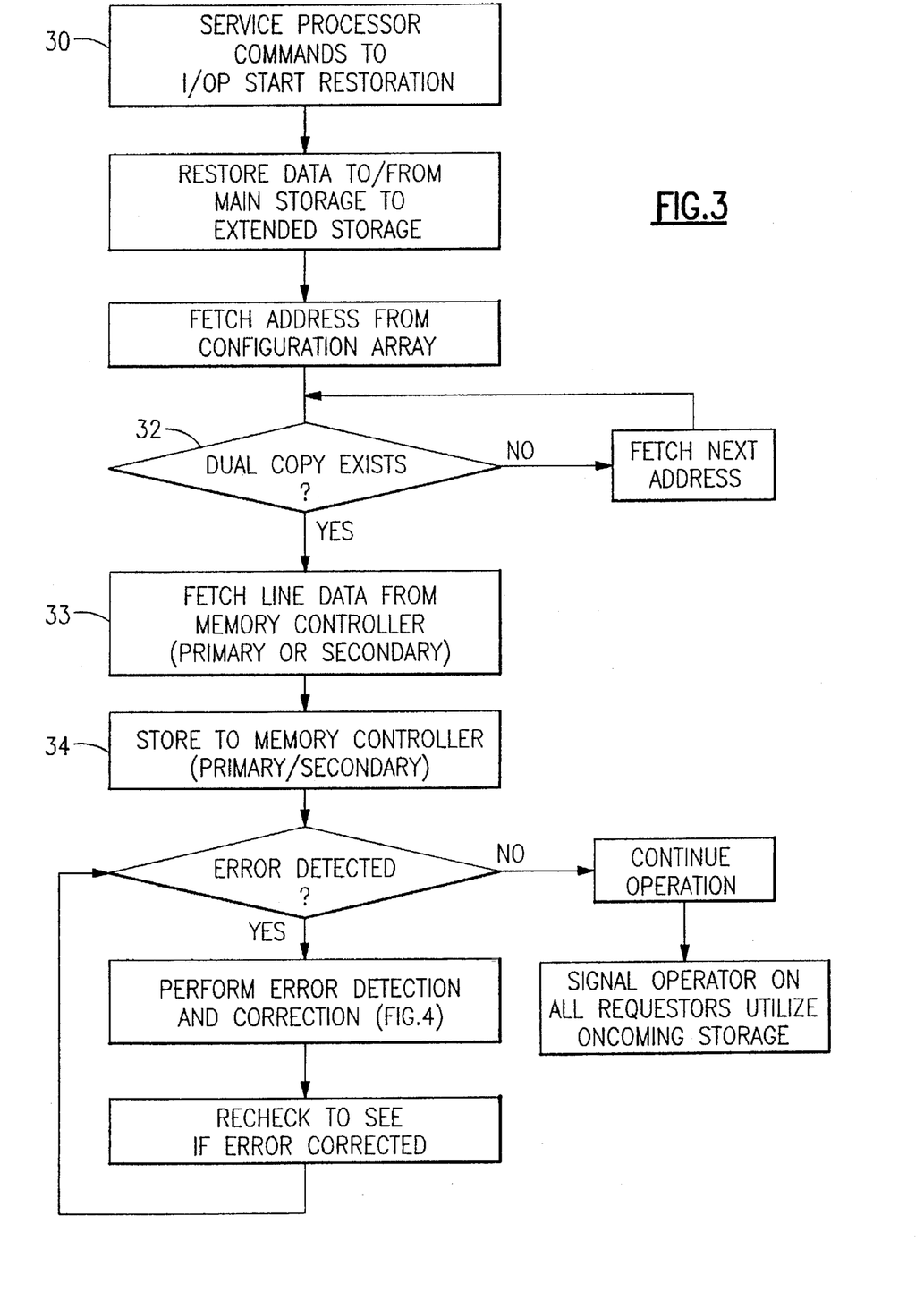
FIGS. 3 and 4 are a flow chart depicting the operation of a service processor in restoring storage data and detection and correction of possible errors during this process.

In the present invention the system does not have to be stopped or quiesced. An example of such an operation is shown in FIG. 3. A service processor is provided in this scenario which controls the copy. A service processor is a special processor designated for diagnostic and maintenance purposes and to exchange such information with the multiprocessor.) However, in a fault tolerant multiple copy system not all data is dual copied to both sides. An IOP is selected by the service processor 30 (either after repair is made, or when new or additional memory controller or storage arrays are to be added). The IOP issues copy segment commands to the System. The Ongoing side gives no responses during this operation and the requestors know the side is under repair. The IOP uses the configuration array to copy only the addresses identified as being dual 32. The data is fetched from the ongoing system storage 33 and is stored to both storage arrays 34. The data when completed is refetched from the oncoming side to ensure the data is stored without error.

Figure 4:
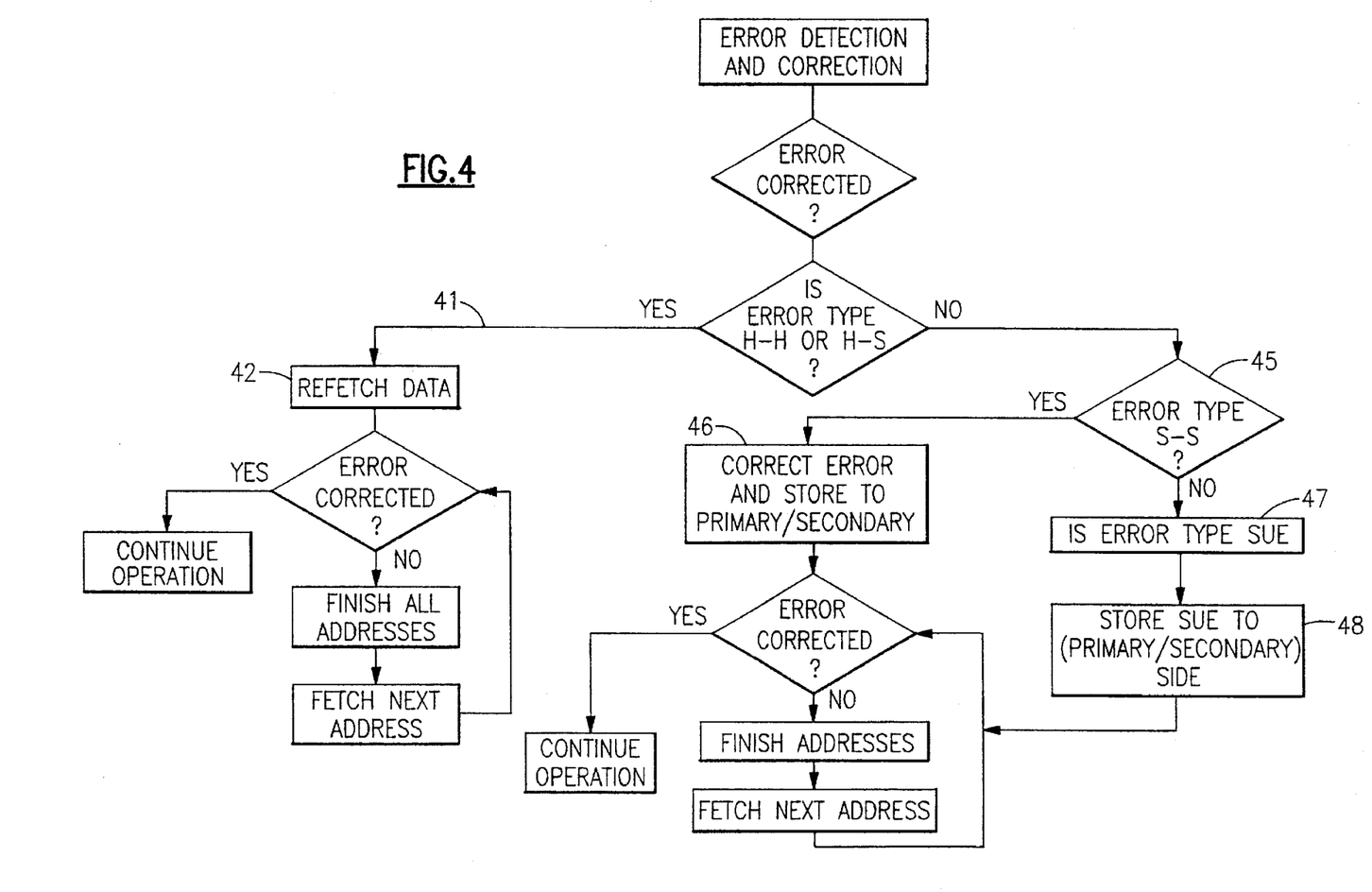

FIG. 4 shows the error detection and correction mechanism. If fetch from the ongoing side includes an error, particularly either an H-H or H-S error 41, refetch 42 is done to correct the error. If the error is an S-S 45 or SUE 47 related error detected during a fetch, the correct data 46 or a SUE 47 is restored to the oncoming sides.

The ongoing system does stores to both sides while the IOP is duplicating the data. The ongoing begins fetches from the oncoming side at the completion of the copy. The IOP signals the Service Processor which signals the ongoing side to utilize the oncoming memory controller/storage arrays.

In another embodiment of the present invention to correct soft-soft, or a SUE type error, the Memory Controller is designed to detect the error condition and correct it by signalling other System Controllers to refresh the data and correct the error. Similarly, CPs can detect an error condition and do refresh themselves from other Memory Controllers 13 or signal the System to refresh the data. Even the IOPs can detect errors and do a refresh automatically or signal the System to refresh the data.

When new arrays have to be added or old ones need to be replaced, the same methodology as described above is used. The side where the arrays have to be added or replaced becomes the oncoming side and is taken out of the configuration. In case of new arrays new data will be restored from the oncoming to the ongoing side providing also the address and new IDs of the added arrays.

This same methodology is also applicable to repair or extended storage 14, with some extra steps as described below. An extended storage is usually larger, has slower performance (response time) and exists as a separate entity from the main storage. Data is generally transferred from main storage to extended storage for Page Out commands and from extended storage to main storage for Page In commands. Data is transferred in large blocks of 2-4K bytes.

In addition, the device and method of the present invention are also applicable to multi-storage operations wherein storage is fetched and stored either within main storage locations or within extended storage locations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a multiprocessor system with at least one memory unit, having at least two memory controllers and a plurality of processors, each of said processors being defined as a requestor, a method of allowing correction of data errors, comprising the steps of:

designating separate portions of said memory unit so that each of said memory controllers has exclusive control of at least one of said separate memory portions for its use;

storing physical addresses of each of said memory portions in a logic array in said memory unit;

designating one memory controller as primary and allowing said primary memory controller to perform any requested fetch or store command issued by said requestors;

each of said memory controllers sending a response to said requestor upon completion of said fetch and store commands by said primary memory controller;

said requestor detecting an error condition if said requestor does not receive said signal from each of said memory controllers;

said memory controllers determining the type of any said error detected; and said requestor copying data into said memory portion of said memory controller detecting the error from said other memory controller's storage in order to correct said data causing an error condition.

2. The method of claim 1, further comprising the step of categorizing said error as either as uncorrectable error hard-hard (H-H), uncorrectable hard-soft (H-S), uncorrectable error soft-soft or and uncorrectable error special (SUE).

3. The method of claim 2, further comprising the following steps: determining said error as being a soft-soft uncorrectable error; providing address and ID of source of said error and its location to said other memory controller not associated with detecting said error via said requestor; said memory controller not associated with said error providing said other memory controller error free data; said memory controller detecting said error condition refreshing its data after error free data has been provided to it; signalling said requestor of said corrected condition; and said requestor refetching said corrected data and continuing operation.

4. The method of claim 2, further comprising the following steps: determining said error as being a special uncorrectable error (SUE); providing the address and ID or source of said error and its location to said other memory controller not associated with detecting said error via said requestor; said memory controller fetching non-erroneous data from said storage and refreshing data; said memory controller refetching data from said failing storage to acknowledge correct store and signalling said requestor of said corrected condition; and said requestor refetching said corrected data and continuing operation.

5. The method of claim 1, further comprising the step of defining an extended storage as part of said multiprocessor to function as another memory unit.

6. The method of claim 1, further comprising the step of performing multi-storage data transfers between two storage of same storage type.

7. The method of claim 6, further comprising the step of transferring data between main storage and an extended storage.

8. In a multiprocessor system with at least one memory unit, having at least two memory controllers, at least one central processor (CP), at least one service processor (SP) and a plurality of input-output (I/O) processors, each of said CP, I/O or SP processors being defined as a requestor, a method of restoring master data to a memory controller due to repairs made on said multiprocessor, comprising the steps of:

designating separate portions of said memory unit so that each of said memory controllers has exclusive control of at least one of said separate memory portions for its use;

storing physical addresses of each of said memory portions in a logic array in said memory unit;

said memory controllers performing fetch and store commands issued by said requestor;

beginning restoration process by signaling one I/O processor via said service processor;

said I/O processor further having a configuration array initialized to identify dual copy addresses of data and said I/O processor only copying those addresses identified as being duplicates;

said I/O processors fetching and copying information from said side without repairs to said side with repairs; and said data from side with repairs being refetched after copying is completed to ensure proper storage of data to said repaired side.

9. The method of claim 8, further comprising the step of performing multi-storage transfers of same storage type.

10. The method of claim 9, further comprising the step of transferring data between main storage and an extended storage.

11. The method of claim 8 further comprising the step of detecting errors while performing repairs, said error detecting mechanism further defining said errors as a hard-hard, hard-soft, soft-hard, soft-soft or an SUE error; said requestor determining from said logic array if dual copies of data exist; and said I/O processor correcting said error by recopying data from storage source containing non-erroneous data if said data is duplicated and signalling said service processor upon correction of said error.

12. The method of claim 11, further comprising the step of providing an extended storage, said extended storage also functioning as one of said memory units.

13. In a multiprocessor system with at least one memory unit, having at least two memory controllers, at least one central processor (CP), at least one service processor (SP) and a plurality of input-output (I/O) processors, each of said CP, I/O or SP processors being defined as a requestor, a method of adding parts to said multiprocessor while said multiprocessor continues its operation, comprising the steps of:

designating separate portions of said memory unit so that each of said memory controllers has exclusive control of at least one of said separate memory portions for its use;

storing physical addresses of each of said memory portions in a logic array in said memory unit;

designating one memory controller as primary and said other memory controller as secondary and allowing said primary memory controller to perform any requested fetch or store command issued by said requestors;

associating said secondary memory controller with said oncoming parts;

copying data upon completion of addition from said oncoming part's associated secondary memory controller to said primary storage controller's memory portion;

said data from said side without additions being refetched after copying is completed to ensure proper storage of data, locking data protection mechanism so that only one of said requestors can access said data previously stored at any one time.

14. The method of claim 13, further comprising the step of providing an extended storage, said extended storage also functioning as one of said memory controllers.

15. The method of claim 14, further comprising the step of performing data transfers between main storage and said extended storage.

16. The method of claim 13, further comprising the step of performing multi-storage data transfers of same storage type.

17. In a multiprocessor system with at least one memory unit, and having at least two memory controllers, at least one central processor (CP), at least one service processor (SP) and a plurality of input-output (I/O) processors, each of said CP, I/O or SP processors being defined as a requestor, a device for allowing correction of data errors, comprising:

memory portions defined in said memory unit as exclusively designated to each one of said memory controllers;

a logic array provided in said memory unit for each of said memory portions for storing physical addresses of each of said memory portions in said memory unit so that said memory portions can be accessed at any time;

error correction and detection means for detecting hardware errors;

means for signaling error conditions to each requestor in response to fetch and store commands generated by said requestor; and copying means for copying non-erroneous data from said memory portion of said memory controller not associated with said error source to said other memory controller's memory portion.

18. In a multiprocessor system with at least one memory unit, and having at least two memory controllers, at least one central processor (CP), at least one service processor (SP) and a plurality of input-output (I/O) processors, each of said CP, I/O or SP processors being defined as a requestor, a device for allowing addition of hardware parts to said multiprocessor, comprising:

memory portions defined in said memory unit as exclusively designated to each one of said memory controllers;

a logic array provided in said memory unit for each of said memory portions for storing physical addresses of each of said memory portions in said memory unit so that said memory portions can be accessed at any time;

means for associating one of said memory units to said parts to be added while said memory controller and at least part of said multiprocessor is configured off while the remaining portions are in continuous working order;

copying means for copying data from said memory portion of said memory controller associated with parts to be added to said other memory controller's memory portion upon completion of said addition.

19. The device of claim 18, wherein said device is used for repairs rather than addition of parts.

* * * * *

UNITED STATES PATENT AND TRADEMARK OFFICE
CERTIFICATE OF CORRECTION

PATENT NO. : 5,632,013

DATED : May 20, 1997

INVENTOR(S) : Krygowski et al.

It is certified that error appears in the above-identified patent and that said Letters Patent are hereby corrected as shown below:

| | |
|---|---|
| Column 6, Line 62<br>Claim 2 | after "soft-soft" insert --(S-S),-- |
| Column 7, Line 9<br>Claim 4 | "or" should be --of-- |

Signed and Sealed this

Twenty-first Day of October 1997

Attest:

BRUCE LEHMAN

Attesting Officer     Commissioner of Patents and Trademarks